INVENTORS
HIDEO AKIYAMA
DAVID G. STOCKWELL

BY Louis A. Kline
John J. McLago
Nathan Cass
THEIR ATTORNEYS

United States Patent Office 3,424,524
Patented Jan. 28, 1969

3,424,524
MICRO-IMAGE DISPLAY APPARATUS
Hideo Akiyama, Los Angeles, and David G. Stockwell, Compton, Calif., assignors to The National Cash Register Company, Dayton, Ohio, a corporation of Maryland
Filed May 31, 1966, Ser. No. 554,001
U.S. Cl. 353—22          14 Claims
Int. Cl. G03b 21/14

This invention relates generally to means and methods for retrieving data recorded in micro-image form, and more particularly to means for displaying micro-images.

The broad object of this invention is to provide improvements in micro-image display means.

A more specific object is to provide simple and economical means for displaying, from a transparency, a selected one of a large plurality of high resolution micro-images of 100 to 1 or greater reduction ratio.

Another object of this invention, in accordance with the previous object, is to provide micro-image display means including greatly simplified and novel means for accurately maintaining the required small working distance between the projection lens and the transparency as the two are relatively moved so as to permit a desired micro-image to be displayed.

A further object of this invention, in accordance with one or more of the foregoing objects, is to provide a micro-image display means having improved means for inserting and removing a transparency containing a large plurality of micro-images.

The manner in which the above objects are accomplished in accordance with the invention, as well as other objects, advantages and features thereof, will become apparent from the following description and the accompanying drawings in which:

FIG. 3 is a cross-sectional side view of FIG. 2 taken along the line 3—3 and showing the apparatus in position to receive a transparency.

Like characters designate like elements throughout the figures of the drawings.

Figure 1:
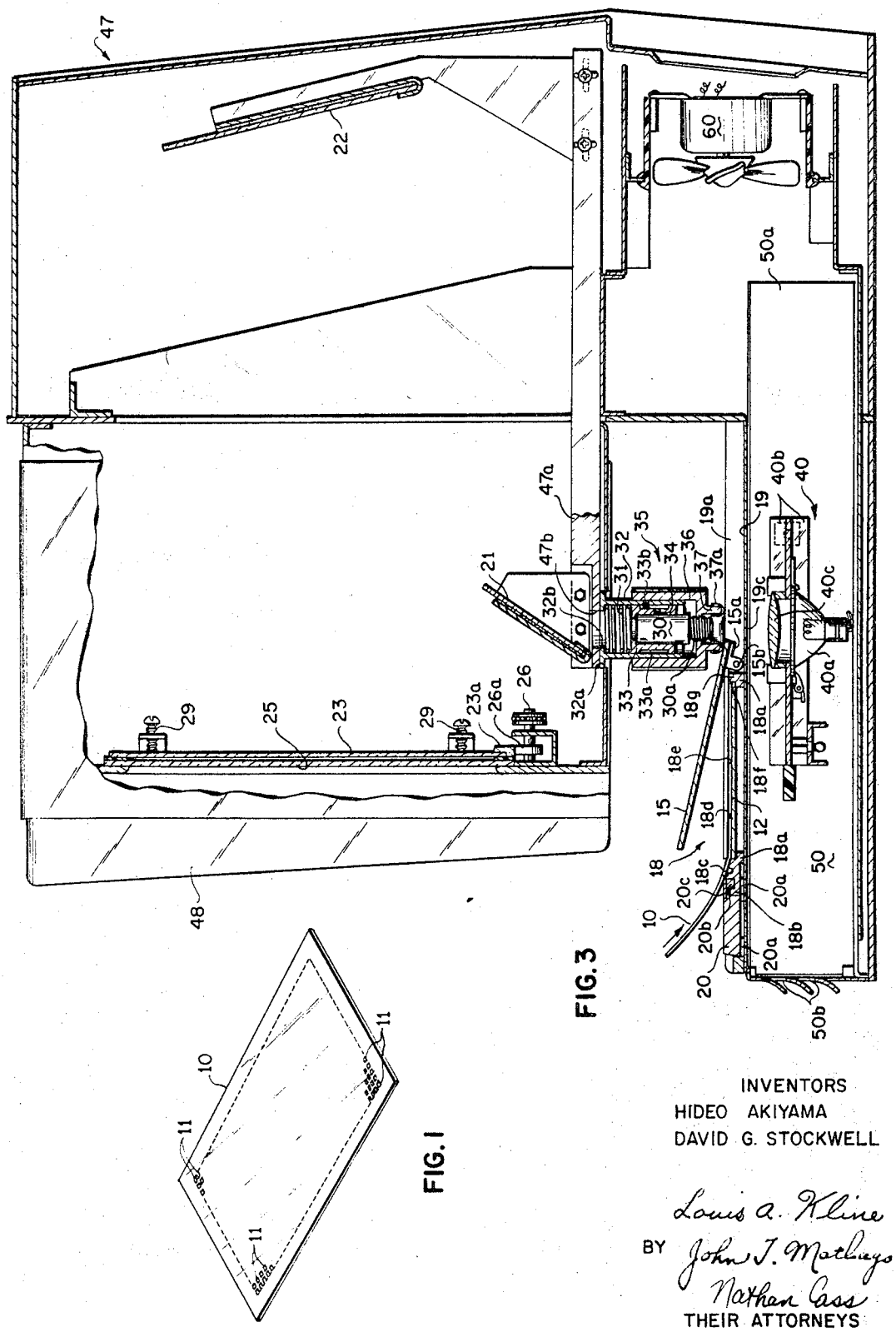
FIG. 1 is a view of a transparency containing a plurality of micro-images, any selected one of which can be displayed in accordance with the invention.

In the specific embodiment of the invention to be described herein, a "micro-image" may, for example, be an image of about .8″ x .10″ having a resolution of typically 500 lines per millimeter, which is to be displayed at a magnification of typically 100 to 1 or greater. With reference to FIG. 1, the term "transparency" refers to a thin flexible transparent film 10 having a large plurality of micro-images 11 recorded thereon. The transparency 10 may typically comprise a 0.3 millimeter thick 3″ x 5″ rectangular cellulose film having over 1,000 micro-images 11 recorded thereon in a row-column arrangement. The words "working distance" will be used herein to designate the spacing between the transparency and the nearest element of the micro-image display means.

A preferred embodiment of a micro-image display means in accordance with the invention is illustrated in FIGS. 2–5. This preferred embodiment is of the rear projection type which projects a selected micro-image 11 (FIGS. 2 and 4) recorded on a transparency 10 inserted in the apparatus, via a projection lens assembly 35, mirrors 21 and 22, and oscillating anti-scintillation screen 23 (FIGS. 3 and 4), onto the back of a translucent viewing screen 25 for viewing from the front thereof.

It will be understood that during display of a selected micro-image 11 recorded on a transparency 10, the transparency 10 is caused to be firmly held flat and horizontal (FIGS. 2, 4 and 5) between upper and lower glass plates 12 and 15 which, in turn, are disposed in a slidable glass support member 18 having tetrafluoroethylene (commonly known by the trade name Teflon) coated legs 18a so as to permit smooth sliding movement of member 18 on horizontal base 19 under projection lens assembly 35. Also provided is a position control bar 20 having tetrafluoroethylene coated legs 20a for smooth sliding movement on base 19, and tetrafluoroethylene coated edges 20b (FIGS. 2 and 4) for smooth sliding movement between end flanges 19a provided on base 19, whereby position control bar 20 is restricted to slidable movement on base 19 in the direction of arrow y.

Figure 2:
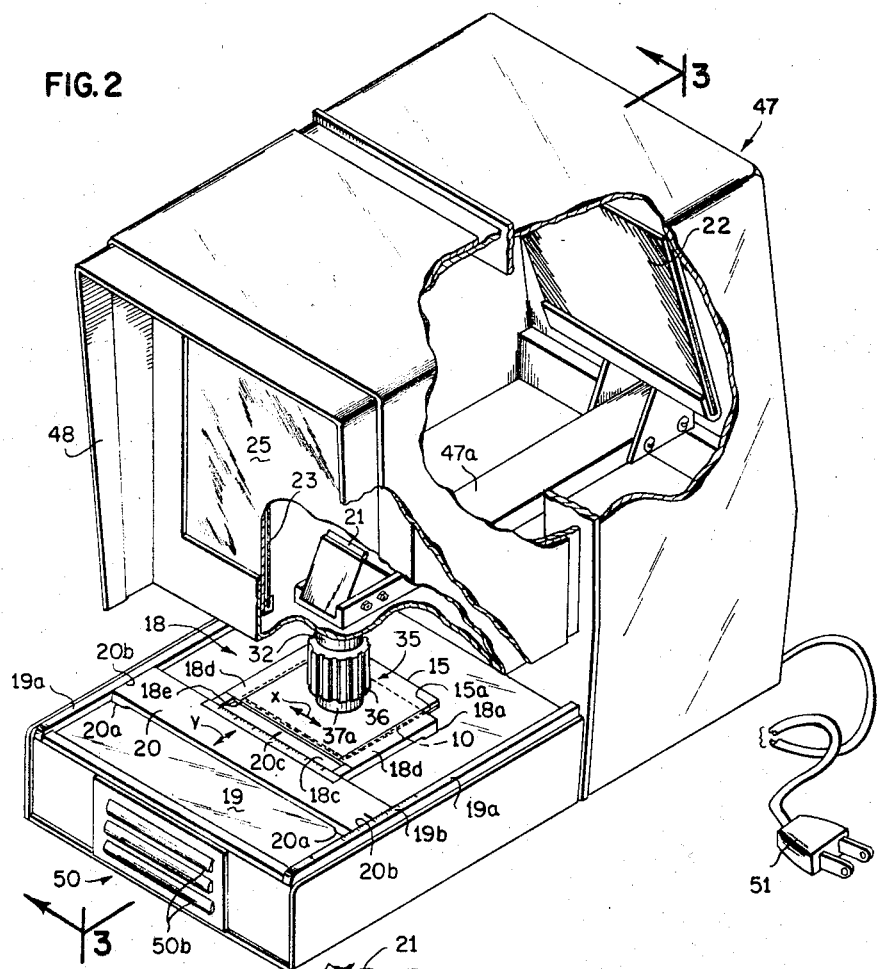
FIG. 2 is a pictorial view, partially broken away, of a micro-image display apparatus incorporating the invention.
Figure 4:
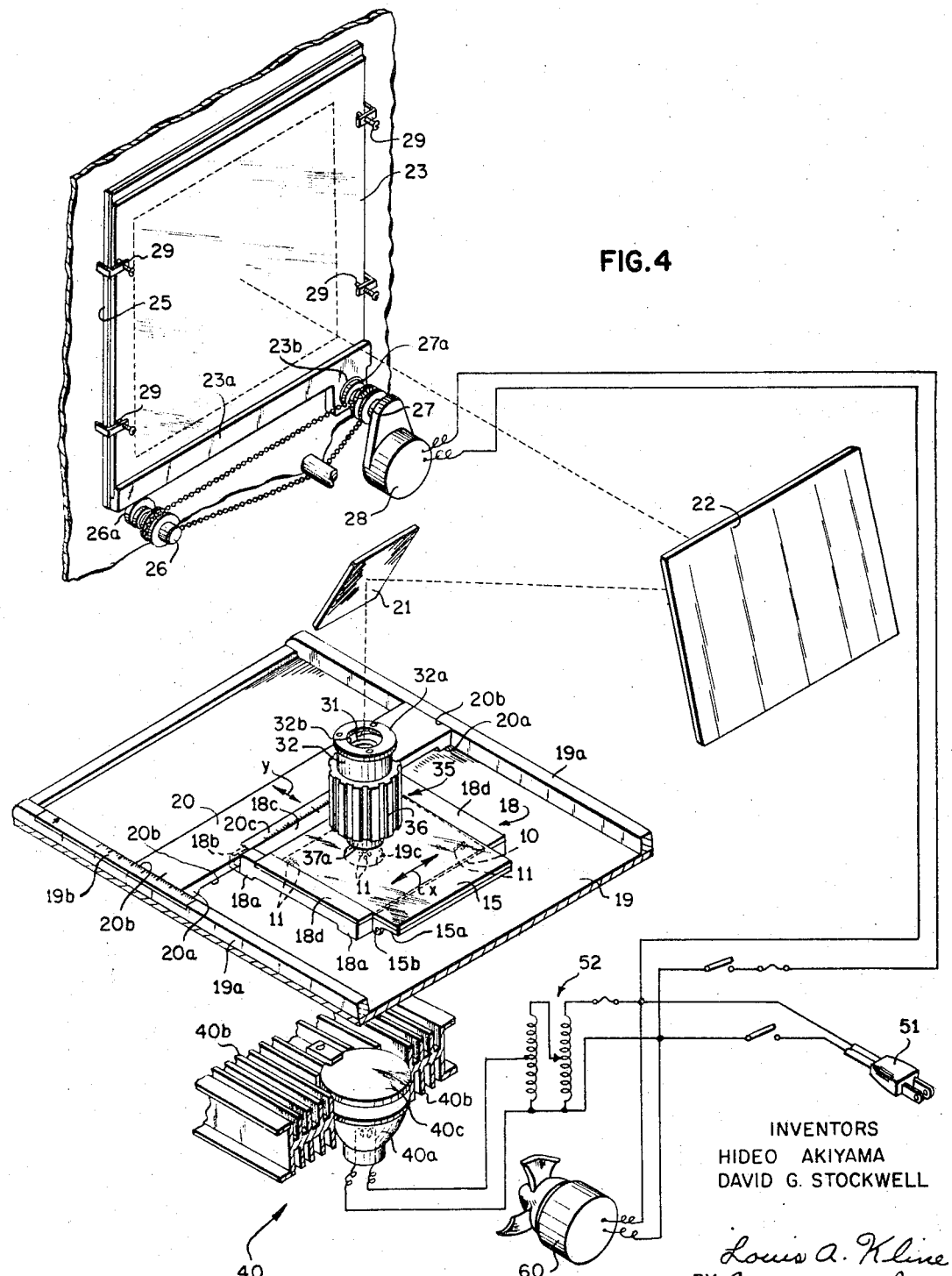
FIG. 4 is a fragmentary, partially schematic view of FIG. 1 showing the major components of the apparatus.

In order to control the x–y position of glass supporting member 18 with respect to projection lens assembly 35, position control bar 20 is additionally provided with an engaging member 20b' (FIG. 5) cooperatively coupled to an engaging member 18b of glass support member 18 so as to permit member 18 to move together with bar 20 for movement in the direction indicated by arrow y, while also permitting member 18 to slide along bar 20 so as to provide movement thereof in the direction indicated by arrow x (FIGS. 2 and 4). The x position of the transparency 10 in glass supporting member 18 is indicated by a scale 20c provided on position control bar 20, and the y position of the transparency 10 in glass supporting member 18 is indicated by a scale 19b provided on one of the base flanges 19a, whereby each micro-image 11 on a transparency 14 can be located respective x–y coordinates on scales 20c and 19b.

In order to permit simple and expeditious insertion of the transparency 10 between glass plates 12 and 15, the glass cover plate 15 has its back end suitably affixed to a pivot member 15a (FIGS. 3–5) which is pivotable about rod 15b suitably attached to glass support member 18. As will hereinafter be explained in more detail, the projection lens assembly 35 (FIGS. 3 and 5) is urged against the upper glass plate 15 in order to maintain focus for any x–y position of the transparency. In the present invention, such urging is also advantageously used for the additional purpose of providing the force required for pivoting the upper glass plate 15 upward into a transparency receiving position (FIG. 3). This is accomplished by simply moving frontward control bar 20 (and thus glass support member 18) until the projection lens assembly 35 is on the back side of pivot rod 15b, as shown in FIG. 3. An additional advantage is that there is no need to provide for lifting of the projection lens assembly 35 in order to insert a transparency 10.

To facilitate proper alignment of a transparency 10 inserted between glass plates 12 and 15, the glass support member 18 is provided with a sloping receiving surface 18c and guide flanges 18d forming grooves 18e (FIG. 3) between which the side edges of the transparency are inserted. The lower glass plate 12 is disposed below guide flanges 18d in a cut out recess 18f (FIG. 5) of glass support member 18 so as to provide a slightly raised shoulder 18g (FIGS. 3 and 5) for stopping the leading edge of an inserted transparency 10 in a properly aligned position.

Having described how the spring biasing of the projection lens assembly 35 against the upper glass plate 15 provides for insertion of a transparency in proper alignment between glass plates 12 and 15 of glass support member 18, and how an inserted transparency 10 can be positioned to a desired x–y location with the aid of the position control bar 20 coupled to glass support member 18, the optical and associated portions of the display apparatus will next be considered.

Referring to FIGS. 3 and 4, it will be understood that the basic light source for the display apparatus is provided by a light condensing assembly 40 disposed in a suitable enclosure 50 (FIGS. 2 and 3) below an illumination hole 19c (FIGS. 3–5) provided in base 19 opposite the projection lens assembly 35, the base 19 serving as a top cover for the enclosure 50. The light condensing assembly 40 includes a filament-type lamp 40a energized from an A-C power source via a plug 51 and an appropriate transformer 52 (FIG. 4), cooling fins 40b (FIGS. 3 and 4), and a focusing lens and heat filter 40c. A fan 60 (FIGS. 3 and 4) is provided at the rear of the apparatus for cooling purposes. The back end 50a (FIG. 3) of enclosure 50 is open to receive cooling air from fan 60, which flows past light condensing assembly 40 and out of slots 50b (FIGS. 1 and 3) at the front end of the enclosure 50.

Figure 5:
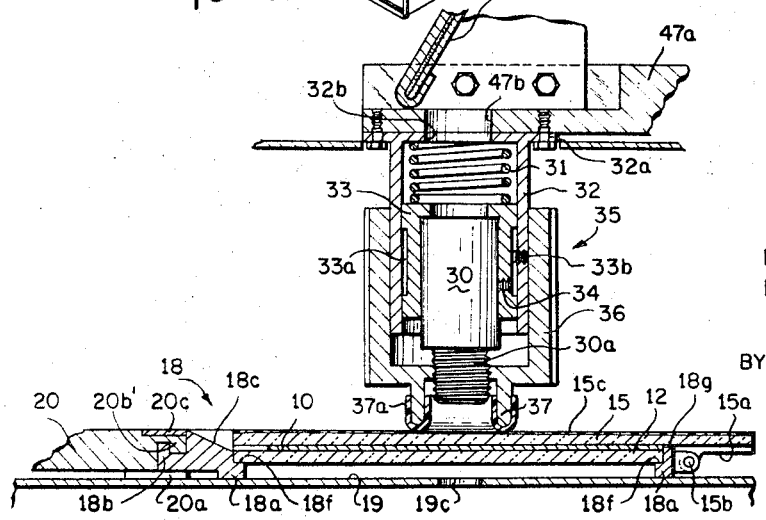
FIG. 5 is an enlarged partial view of FIG. 3 showing details of the projection lens and the glass supporting member holding the transparency.

As will be understood from FIGS. 3 and 5, the focusing lens 40c provides a beam of light which passes, via hole 19c, to form a reduced focused image of the filament of lamp 40a on the transparency 10 held between glass plates 12 and 15, the transparency area illuminated being sufficient to include at least one micro-image 11, and may typically include many micro-images. The glass plates 12 and 15 aid in preventing overheating of the transparency by conducting heat away therefrom.

Light passing through the selected micro-image on the transparency 10 is collected by a projection lens 30 contained in the projection lens assembly 35 (FIGS. 3 and 5), causing an enlarged image of the selected micro-image to be focused onto the viewing screen 25, via mirrors 21 and 22 and oscillating anti-scintillation screen 23 (FIGS. 3 and 4) contained in an upper enclosure 47 (FIGS. 2 and 3). Anti-scintillation screen 23 is driven for movement between pins 29 (FIG. 4) and viewing screen 25 by motor 28, which is chain-coupled to driving shafts 26 and 27 having respective cams 26a and 27a respectively cooperating with lower edge member 23a (FIGS. 3 and 4) and hole 23b (FIG. 4) at the bottom of screen 23. Slidable hood 48 (FIGS. 2 and 3) is provided over the upper enclosure 47 to screen out extraneous light.

It will be understood that projection lens 30 (FIGS. 3 and 5) is a microscope type lens corrected for cover glass plate 15 and typically having a magnification of 115, a numerical aperture greater than 0.3, and a very small working distance (i.e. the distance between the nearest element of the lens 30 and the transparency 10), which is typically less than 20 millimeters and may, for example, be 11 millimeters. It will also be understood that such a lens 30 is provided with a very limited depth of focus in order that scratches on the transparency surfaces (also on the surfaces of the glass plates 12 and 15) will be out of focus, and thereby not interfere with the quality of the micro-image displayed on the viewing screen 25. Such a situation produces a problem for a micro-image display apparatus, because of the importance of maintaining the micro-images on the transparency substantially in focus for any x–y position to which the transparency is moved. Instead of providing an expensive precise x–y positioning mechanism to solve this problem, the present invention causes the projection assembly to be urged against cover glass plate 15 which is chosen to be of precise uniform thickness of typically 0.125 inch±.002 inch, whereby the working distance will remain substantially constant despite changes in the actual horizontal position of the transparency caused by an imprecise x–y movement.

The upper surface of glass cover plate 15 is provided with a thin anti-reflection coating 15c (FIGS. 3 and 5). It might be thought that the urging of the projection lens assembly 35 thereagainst would cause scratching or galling of the coating 15c during x–y movement, and thereby require lifting of the lens assembly 35 off the cover glass plate during x–y movement. However, by providing the lens assembly portion 37 which contacts the upper glass plate 15 with a lubricating surface 37a (FIG. 5), such as provided by a film of .002 to .005 inch tetrafluorethylene, and with five pounds of urging pressure, the cover glass plate 15 was found to be free of scratches or galling even after as many as ten thousand strokes of approximately two seconds per stroke, and wear on the tetrafluorethylene surface was only about .0005 inch. Thus, in accordance with the present invention, the projection lens assembly 35 need not be lifted from the cover glass plate 15 during x–y movement, nor for insertion of a transparency as previously explained in connection with FIG. 3.

Referring primarily to FIG. 5, the projection lens assembly 35 containing the microscope-type projection lens 30 will now be considered in detail. The fixed portion of the lens assembly 35 is a hollow tubular member 32 affixed to a support member 47a of the upper enclosure by flanges 32a provided at the upper end of member 32. Member 32 is open at its lower end, and at its upper end is provided with a reduced diameter hole 32b concentric with a hole 47b in support member 47a leading to mirror 21. A biasing spring 31 is inserted in fixed tubular member 32 from the lower end threof, followed by a slidable cylinder 33 in which the prejection lens 30 is secured by a set screw 34. The slidable cylinder 33 has a reduced diameter portion 33a cooperating with a set screw 33b to restrict the vertically slidable movement of cylinder 33 to the length of the reduced portion 33a.

Still referring primarily to FIG. 5, projection lens 30 is provided with a reduced threaded portion 30a on which is threaded a grooved cylindrical focus adjusting member 36 (see also FIGS. 2 and 4) having a sufficient inner diameter to receive fixed tubular member 32. Cylindrical member 36 also has a reduced diameter portion 37 at its lower end, which is coated with a lubricating film 37a, such as tetrafluorethylene or molybdenum disulfide. The spring 31 is chosen so that the projection lens assembly 35 is urged against the cover glass plate 15 via lubricating film 37a for all x–y positions of the transparency 10. It will be understood that by manually adjusting focus member 36 on the threaded portion 30a, the working distance is varied, thereby providing a convenient manual focusing control, which focusing will be maintained by the spring biasing regardless of the x–y position of the transparency. Although gravity alone could be used for urging the projection lens assembly 35 against glass plate 15, it is much more advantageous to use spring biasing since the urging pressure can be conveniently controlled independently of the weight of the projection lens assembly 35.

Although the description herein has been concerned with a particular illustrative embodiment, it is to be understood that the invention is subject to various modifications in both construction and arrangement without departing from the spirit of the invention. The invention, therefore, should be considered as including all possible modifications and variations coming within the scope of the invention as defined in the appended claims.

What is claimed is:

1. In apparatus for displaying a reduced image recorded on a transparency, a projection lens assembly, a light source, retaining means for retaining a transparency between said projection lens assembly and said light source, said retaining means including a pivotable member disposed over and in contact with the transparency on the projection lens assembly side thereof, means for urging said projection lens assembly against said pivotable member, and means for moving said retaining means to a position so that the urging of said projection lens assembly against said pivotable member causes pivoting thereof, whereby a transparency can be inserted or removed.

2. The invention in accordance with claim 1, wherein said pivotable member includes a cover glass plate, and wherein the portions of said projection lens assembly which contact said pivotable member are provided with a lubricating film.

3. The invention in accordance with claim 1, wherein said projection lens assembly contains a microscope-type projection lens providing a magnification of 100 to 1 or greater and having a working distance of less than 20 millimeters.

4. The invention in accordance with claim 3, wherein said projection lens has a numerical aperture of 0.3 or greater.

5. In apparatus for displaying a selected reduced image from a transparency containing a large plurality of reduced images recorded thereon, a projection lens assembly, a light source, first means for retaining a transparency between said lens and said light source, second means cooperating with said first means for positioning a selected image in a display position with respect to said projection lens assembly, said first means including a reference member providing a surface parallel to and precisely spaced from the transparency and being transparent for those portions thereof adjacent said reduced images, and means for resiliently urging said projection lens assembly against said reference surface for all image display positions of the transparency, whereby said lens assembly is maintained at a precise distance from said transparency for all image display positions thereof.

6. The invention in accordance with claim 5, wherein said reference member includes a cover glass plate disposed over and in contact with said transparency, and wherein the portions of said lens assembly which contact said reference member are provided with a lubricating film, whereby movement of said first means is obtainable without lifting said projection lens assembly from contact with said reference member.

7. The invention in accordance with claim 5, wherein said reference member is pivotably mounted at one end thereof, and wherein said second means is constructed and arranged to permit said first means to be moved to a position such that the urging of said projection lens assembly against said reference member causes pivoting thereof, whereby a transparency can be inserted or removed without raising said projection lens assembly.

8. Micro-image display apparatus for displaying a selected one of a large plurality of micro-images recorded on a transparency comprising: a viewing screen, a light source, first means for receiving a transparency and for retaining the transparency in a position so as to receive light from said light source, a projection lens assembly having a projection lens located so as to receive light from said source after passing through said transparency, second means for positioning a selected micro-image in a display position with respect to said projection lens, means cooperating with said projection lens so as to form on said viewing screen an enlarged focused reproduction of an image in said display position, said first means having a cover glass plate of precise thickness disposed over and in contact with said transparency, an anti-reflection coating on said glass plate on the side opposite from said transparency, and means for resiliently urging said projection lens assembly against the anti-reflection coating on said glass plate for all image display positions, the portions of said projection lens assembly contacting said anti-reflection coating being provided with a lubricating film, whereby said lens assembly is maintained at a precise distance from said transparency for all image display positions thereof and whereby said second means can position said first means without lifting said projection lens assembly from contact with said glass plate.

9. The invention in accordance with claim 8, wherein said projection lens is of the microscope-type providing a magnification of 100 to 1 or greater and having a working distance of 20 millimeters or less.

10. The invention in accordance with claim 8, wherein said first means includes means for pivotably mounting said glass plate, and wherein said second means is constructed and arranged to permit said first means to be moved to a position such that the urging of said projection lens assembly thereagainst causes pivoting of said glass plate, whereby a transparency can be inserted or removed without raising said projection lens assembly from contact with said first means.

11. The invention in accordance with claim 8, wherein said projection lens assembly includes a fixed portion, a movable portion movable in a direction towards said cover glass plate, means for mounting said projection lens for movement along with said movable portion, and a spring interposed between said fixed and movable portions for urging said movable portion into resilient contact with said cover glass plate, said movable portion also including an adjustable member for adjusting the spacing between said projection lens and the surfaces of said movable portion which contact said glass cover plate.

12. The invention in accordance with claim 8, wherein said display apparatus is of the rear projection type, said means cooperating with said projection lens being constructed and arranged to project said enlarged image on the opposite side of said viewing screen from which said viewing screen is viewed.

13. The invention in accordance with claim 8, wherein said display apparatus is provided with a horizontal base member below said projection lens assembly, and wherein said first and second means are constructed and arranged for cooperative engagement and slidable movement on said base member such that said second means is restricted to slidable movement in only a first direction with respect to said projection lens assembly while said first means is caused to move together with said second means during movement in said first direction and is also movable with respect to said second means in a direction perpendicular to said first direction, whereby x-y movement of a transparency retained in said first means is provided.

14. The invention in accordance with claim 13, wherein said first means includes a lower glass plate cooperating with said cover glass plate so as to retain a transparency therebetween.

References Cited

UNITED STATES PATENTS

| 1,894,005 | 1/1933 | Rose | 88—24 |
| 3,224,326 | 12/1965 | Brownscombe | 88—24 |
| 3,267,801 | 8/1966 | Abbott et al. | 88—24 |
| 3,352,201 | 11/1967 | Brownscombe | 88—24 |

NORTON ANSHER, *Primary Examiner.*

RICHARD M. SHEER, *Assistant Examiner.*

U.S. Cl. X.R.

353—27, 39, 76, 78